United States Patent
Ishikawa et al.

(10) Patent No.: US 6,842,566 B2
(45) Date of Patent: Jan. 11, 2005

(54) OPTICAL FIBER WITH BUILT-IN GRATING AND OPTICAL FIBER FOR FORMING GRATING THEREIN

(75) Inventors: Shinji Ishikawa, Yokohama (JP); Toshiki Taru, Yokohama (JP); Masakazu Shigehara, Yokohama (JP); Masaki Oomura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 170 days.

(21) Appl. No.: 10/193,733

(22) Filed: Jul. 12, 2002

(65) Prior Publication Data

US 2003/0021533 A1 Jan. 30, 2003

(30) Foreign Application Priority Data

Jul. 13, 2001 (JP) .................................... 2001-214256

(51) Int. Cl.⁷ ............................. G02B 6/34; G02B 6/02
(52) U.S. Cl. ..................... 385/37; 385/123; 385/124; 385/126
(58) Field of Search ................... 385/123, 124, 385/126–128, 37, 141, 144

(56) References Cited

U.S. PATENT DOCUMENTS

| | | | | |
|---|---|---|---|---|
| 5,721,800 A | * | 2/1998 | Kato et al. | 385/127 |
| 6,175,680 B1 | * | 1/2001 | Arai et al. | 385/127 |
| 6,314,221 B1 | * | 11/2001 | Riant et al. | 385/37 |
| 6,321,007 B1 | * | 11/2001 | Sanders | 385/37 |
| 6,400,865 B1 | | 6/2002 | Strasser et al. | |
| 2001/0026396 A1 | * | 10/2001 | Enomoto et al. | 359/341.1 |
| 2002/0122624 A1 | * | 9/2002 | Jang | 385/37 |

* cited by examiner

*Primary Examiner*—Juliana K. Kang
(74) *Attorney, Agent, or Firm*—McDermott Will & Emery LLP

(57) ABSTRACT

The present invention provides an optical fiber equipped with a grating that functions as a narrow-band loss filter. The optical fiber has a core, an inner cladding, an intermediate cladding, and an outer cladding, which have refractive indexes $n_0$, $n_1$, $n_2$, and $n_3$, respectively, the refractive indexes having a relationship of $n_0 > n_3 \geqq n_1 n_2$. At least a part of the inner cladding has a grating. The refractive index of the intermediate cladding is lower than the refractive indexes of the inner cladding and the outer cladding such that a recession is formed in the refractive index profile of the clad. The grating is provided on the inner side relative to the recession.

9 Claims, 5 Drawing Sheets

OPTICAL FIBER WITH BUILT-IN GRATING AND OPTICAL FIBER FOR FORMING GRATING THEREIN

BACKGROUND OF THE INVENTION

1. Field of the Invention

The present invention relates to an optical fiber with a built-in grating and an optical fiber used for the same.

2. Description of the Related Art

The structure of the fiber grating may be considered to be an array of transverse planes having a constant refractive index, i.e., equal refractive index planes, which are arranged at regular intervals in an optical fiber. An interval of the equal refractive index planes is a lattice interval, that is, a cycle in the fiber grating. The fiber grating reflects light having a limited wavelength around Bragg wavelength defined by the cycle and refractive index. The fiber grating can be formed by applying light, such as ultraviolet light, which induces a change in the refractive index, onto a photo-sensitive optical fiber, e.g., an optical fiber formed of silica glass to which germanium oxide ($GeO_2$) has been added. An optical fiber with a fiber grating is used as a gain equalizer of a multiplexer/demultiplexer or an optical amplifier in a wavelength multiplex transmission system. The fiber grating used as the gain equalizer induces the coupling between the fundamental mode and a cladding mode of an optical fiber, causing strong power migration from the fundamental mode to the cladding mode. As a result, the fiber grating attenuates the intensity of light propagating in the fundamental mode over a certain wavelength band, functioning as a loss filter.

The fiber grating working as a loss filter is required to precisely control a loss spectrum. A narrower band of the loss filter is preferred because gain equalization with less excess loss can be achieved.

SUMMARY OF THE INVENTION

It is an object of the present invention to provide an optical fiber with a built-in grating that exhibits improved band characteristics, and an optical fiber used for the same.

To this end, according to one aspect of the present invention, an optical fiber is provided with a built-in grating, including a core having a refractive index $n_0$, an inner cladding having a refractive index $n_1$, an intermediate cladding having a refractive index $n_2$, and an outer cladding having a refractive index $n_3$, wherein a grating is formed at least in a part of the inner cladding, where $n_0 > n_3 \geq n_1 > n_2$.

An optical fiber according to another aspect of the present invention, from which the optical fiber with a built-in grating is fabricated, includes a core, an inner cladding, an intermediate cladding, and an outer cladding, their refractive indexes being $n_0$, $n_1$, $n_2$, and $n_3$, respectively, where $n_0 > n_3 \geq n_1 > n_2$, and at least a part of the inner cladding being photo-sensitive such that the refractive index thereof increases when irradiated by light.

The relative refractive index difference between the inner cladding and the intermediate cladding, $(n_2-n_1)/n_1$, may be −1.0% or more and below 0.3%. The part, in which the grating is formed, in the inner cladding of the optical fiber having a built-in grating and the photo-sensitive part, in which a grating is to be formed, in the inner cladding of the optical fiber may be respectively an outer portion of the inner cladding, i.e., the portion that is in contact with the intermediate cladding but not in contact with the core. The inside diameter of the outer portion may be 1.2 times or more but below double the outside diameter of the core. The ratio of the outside diameter of the inner cladding to the outside diameter of the intermediate cladding may be 1.2 or more but below 4.0. The grating formed in the inner cladding may include the planes each having an equal refractive index that are inclined with respect to the axis of the optical fiber.

The present invention is further explained below by referring to the accompanying drawings. The drawings are provided solely for the purpose of illustration and are not intended to limit the scope of the invention.

DESCRIPTION OF THE PREFERRED EMBODIMENTS

Figure 1:
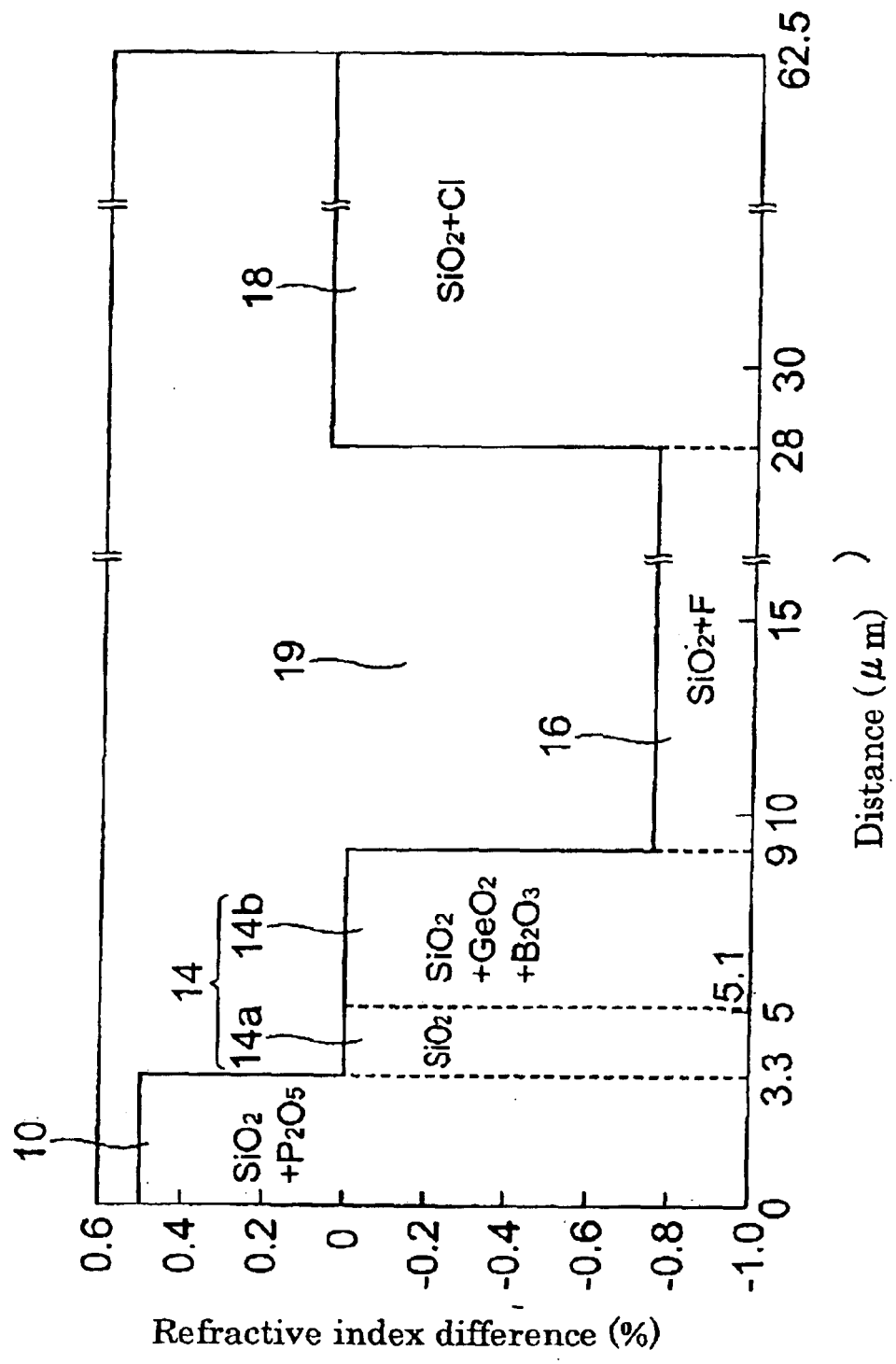
FIG. 1 is a graph showing the refractive index profile of an optical fiber, which is suitable for forming a grating therein, in accordance with an embodiment of the present invention.

Embodiments of the present invention are explained below by referring to the accompanying drawings. In the drawings, the same number refers to the same part to avoid duplicate explanation. The ratios of the dimensions in the drawings do not necessarily coincide with the explanation.

Figure 2:
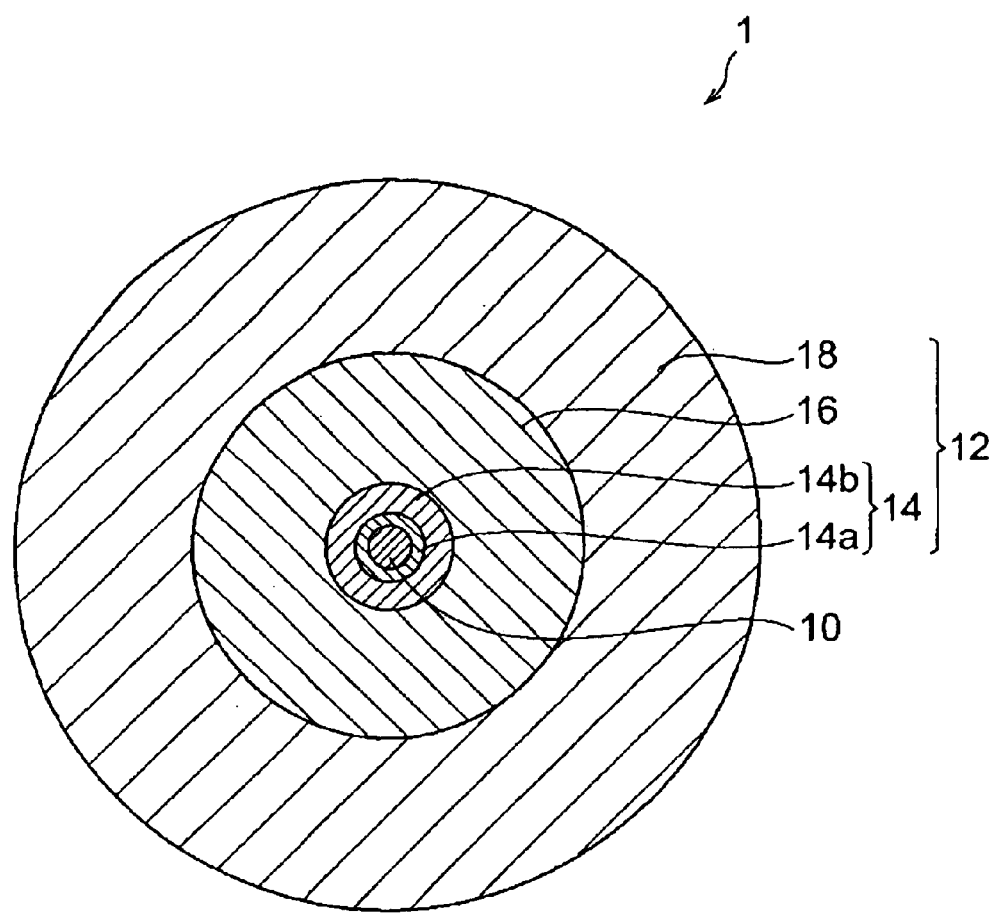
FIG. 2 is a cross sectional view of the optical fiber shown in FIG. 1.

FIG. 1 is a graph showing the refractive index profile of an optical fiber 1 for forming grating therein, which is an embodiment in accordance with the present invention. FIG. 2 is a cross sectional view of the optical fiber 1. Referring to FIG. 2, the optical fiber 1 is constituted by a substantially columnar core 10 and a substantially circular tubular clad 12 concentrically surrounding the core 10 in close contact with the peripheral surface of the core 10. The core 10 and the clad 12 are both formed of silica glass. The core 10 has a higher refractive index than the clad 12.

The clad 12 is formed of three layers, namely, an inner cladding 14, an intermediate cladding 16, and an outer cladding 18, all of which have substantially circular, tubular shapes. The inner cladding 14 concentrically wraps the core 10, the inner surface thereof being in close contact with the peripheral surface of the core 10. The intermediate cladding 16 concentrically wraps the core 10 and the inner cladding 14, the inner surface thereof being in close contact with the outer surface of the inner cladding 14. The outer cladding 18 concentrically wraps the core 10, the inner cladding 14, and the intermediate cladding 16, the inner surface thereof being in close contact with the outer surface of the intermediate cladding 16.

The abscissa in FIG. 1 represents a radial distance from a point on the central axis of the optical fiber 1, the point being represented by the origin of coordinates. The ordinate represents a relative refractive index difference based on a refractive index $n_1$ of the inner cladding 14. The relative refractive index difference of the portion having refractive index n is expressed by $(n-n_1)/n_1$. As will be discussed hereinafter, the inner cladding 14 has a refractive index that is practically equal to the refractive index of pure silica glass.

The core 10 contains phosphorus oxide and has a relative refractive index difference 0.5%. The radius of the core 10 is 3.3 μm.

The outer radius of the inner cladding 14 is 9 μm. The inner cladding 14 has a refractive index substantially equal to the refractive index of the pure silica glass, and is constituted by two circular tubular layers 14a and 14b having different compositions. More specifically, the inner portion 14a (the circular tubular portion having an inner radius of 3.3 μm and an outer radius of 5.1 μm) of the inner cladding 14 is formed of substantially pure silica glass. The outer portion 14b (the circular tubular portion having an inner radius of 5.1 μm and an outer radius of 9 μm) of the inner cladding 14 is formed of silica glass that contains $GeO_2$ and boron oxide. The outer portion 14b is in contact with the intermediate cladding 16, while it is not in contact with the core 10.

As it is well known, the additive $GeO_2$ contained in the outer portion 14b serves as a photosensitive material reactive to ultraviolet light having a wavelength of 260 nm or less. More specifically, the characteristic of the silica glass containing $GeO_2$ is that its refractive index increases in response to the irradiation of the ultraviolet light having a wavelength within the foregoing range. The increase in the refractive index grows greater with increasing total power of the applied light. For this reason, as will be discussed hereinafter, grating can be formed on the outer portion 14b.

The outer radius of the intermediate cladding 16 is 28 μm. The intermediate cladding 16 is formed of silica glass that contains fluorine and has a relative refractive index difference of −0.76%.

The outer radius of the outer cladding 18 is 62.5 μm. The outer cladding 18 is formed of silica glass provided with dehydration treatment using a chloride gas. Since chlorine is added to silica glass during the dehydration treatment, the outer cladding 18 has a refractive index slightly higher than the refractive index of pure silica glass, the relative refractive index difference thereof with respect to that of pure silica glass in this embodiment being 0.05%

Thus, in the optical fiber 1, when the refractive indexes of the core 10, the inner cladding 14, the intermediate cladding 19, and the outer cladding 18 are denoted as $n_0$, $n_1$, $n_2$, and $n_3$, then there is a relationship expressed by $n_0>n_3>n_1>n_2$. The optical fiber 1 can be fabricated by a publicly known method, such as the MCVD method or the OVD method.

As mentioned above, the photo-sensitive material has been added only to the outer portion 14b in the inner cladding 14, so the refractive index of the outer portion 14b increases when irradiated by ultraviolet light. In contrast to this, since the inner portion 14a contains no photosensitive material, the irradiation of ultraviolet light does not cause a change in the refractive index thereof. This means that when ultraviolet light is applied by a known method, such as the phase masking method, grating will be formed only on the outer portion 14b.

Figure 3:
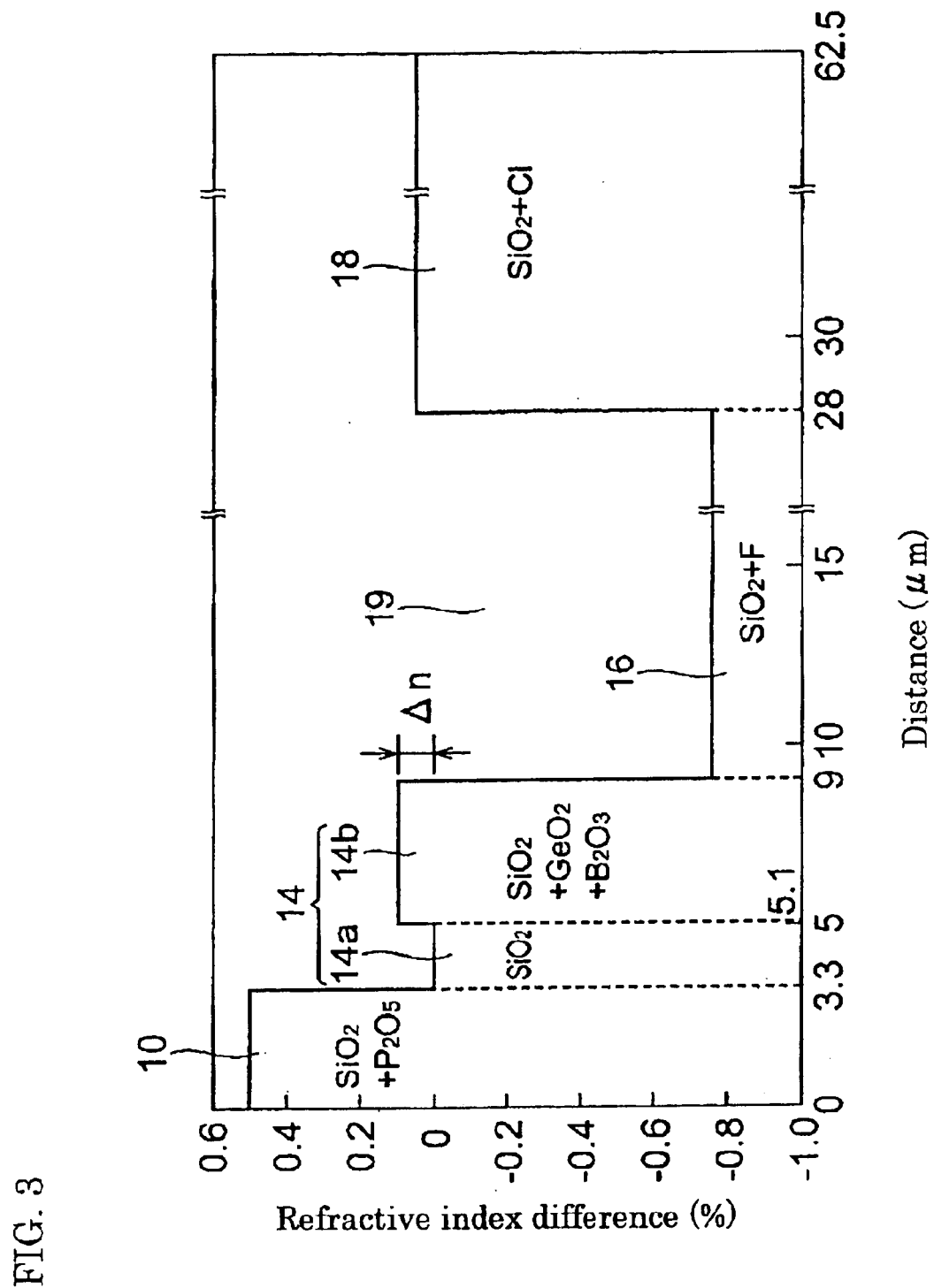
FIG. 3 is a graph showing the refractive index profile of an optical fiber with a built-in grating in accordance with another embodiment of the present invention.
Figure 4:
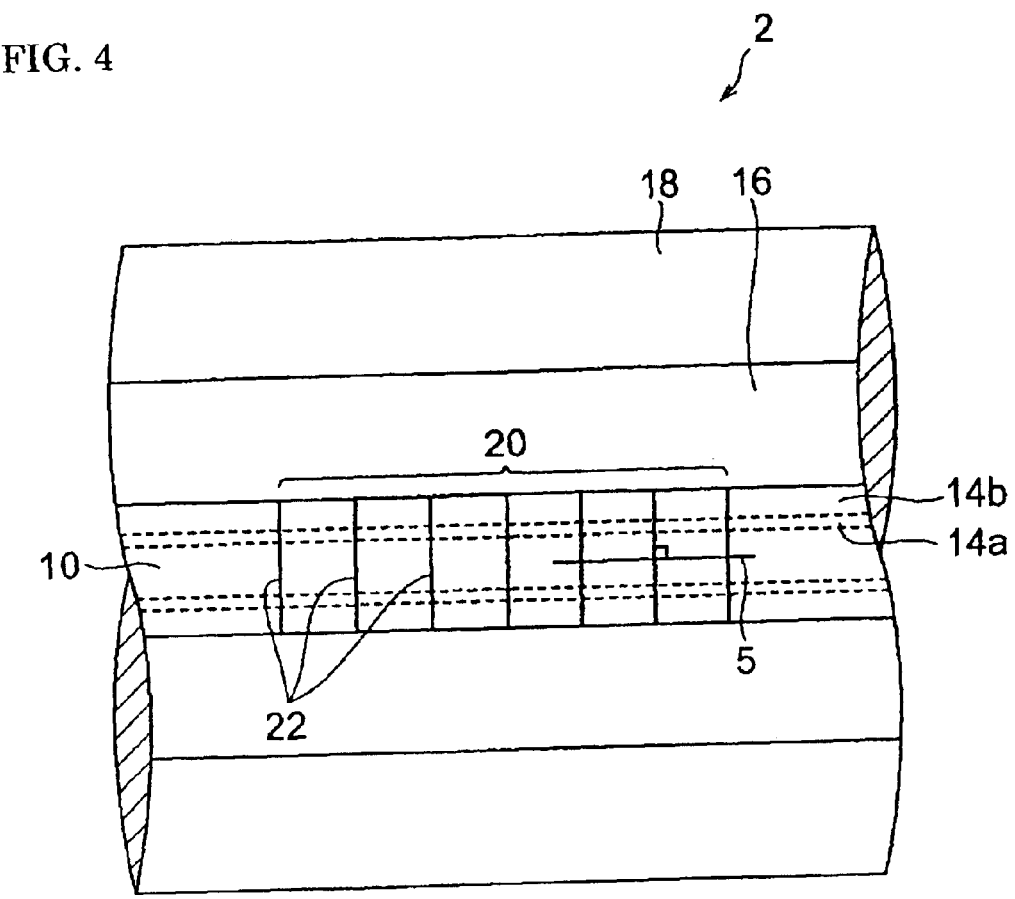
FIG. 4 is a side view of the optical fiber shown in FIG. 3.

FIG. 3 is a graph illustrating the refractive index profile of the optical fiber 2 with built-in grating, which is an embodiment of the present invention. FIG. 4 is a side view of the optical fiber 2. In FIG. 4, for the convenience of illustration, the boundary between the core 10 and the inner cladding 14 and the boundary between the inner portion 14a and the outer portion 14b of the inner cladding 14 are respectively indicated by dashed lines.

Referring to FIGS. 1 and 3, in comparison with the refractive index profile of the optical fiber 1, the refractive index profile of the optical fiber 2 shows that the refractive index of the outer portion 14b of the inner cladding 14 increases, which indicates the presence of a grating 20. In the optical fiber 2, the amount of the increase in the refractive index periodically changes along an axis 5 of the optical fiber 2. In the optical fiber 2 shown in FIG. 4, equal refractive index planes 22 of the grating 20 are perpendicular to the axis 5 of the optical fiber 2.

The optical fiber 2 has two characteristics, one of which is that the intermediate cladding 16 has a refractive index that is lower than those of the inner cladding 14 and the outer cladding 18 and the refractive index profile of the clad 12 has a relatively deep recession 19. The other characteristic is that the grating 20 is provided on the inner side relative to the recession 19 in the clad 12 rather than on the core 10.

Because of the presence of the recession 19, the optical fiber 2 has two different cladding modes. One cladding mode is an inner cladding mode in which power distribution shows the concentration on the inner side relative to the recession 19, and the other cladding mode is an outer cladding mode in which the power is distributed over the entire cladding 12. The inner cladding mode has power distribution close to that of a fundamental mode, so it has high efficiency of coupling to the fundamental mode. In contrast to this, the outer cladding mode has lower efficiency of coupling to the fundamental mode.

For this reason, the grating 20 formed on the inner side of the recession 19 of the refractive index profile has a narrower loss band that allows the fundamental mode to be coupled only to the inner cladding mode with high efficiency. Hence, the optical fiber 2 incorporating the grating 20 can be used ideally as a narrow-band loss filter or a gain equalizer of an optical amplifier. On the other hand, a conventional fiber grating couples the fundamental mode to many cladding modes, so that it has a wider loss band.

The optical fiber 2 provides another advantage in that less reflection is caused in the fundamental mode because no grating is formed on the core 10.

The optical fiber 2 with a built-in grating can easily be fabricated from the optical fiber 1 by forming a grating therein. The inventors have used a phase mask having a cycle of 1070 nm to form an apodized grating 20 having a refractive index cycle of 535 nm over a length of 5 mm in the optical fiber 1. Then, the inventors have measured the loss spectrum and the reflection spectrum of the grating 20.

Figure 5:
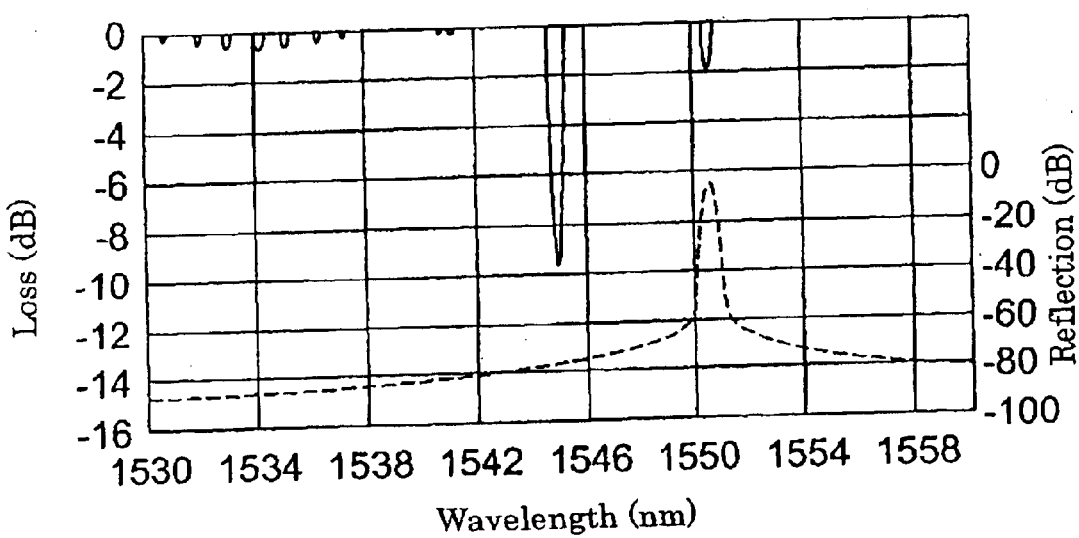
FIG. 5 is a graph showing a loss spectrum and a reflection spectrum of the optical fiber shown in FIG. 3.

FIG. 5 is a graph showing the measurement results, in which the loss spectrum is indicated by the solid line, while the reflection spectrum is indicated by the dashed line. As shown in FIG. 5, the loss spectrum shows the loss peak around 1544.8 nm, and the half-value width thereof is 0.5 nm, which is satisfactorily narrow. The reflection in the band having the loss peak therein is controlled to −50 dB or less, and the grating 20 can be used as a narrow-band, low-reflection loss filter. There is, however, the reflection of −4 dB at 1550.8 nm, which is a Bragg wavelength.

Figure 6:
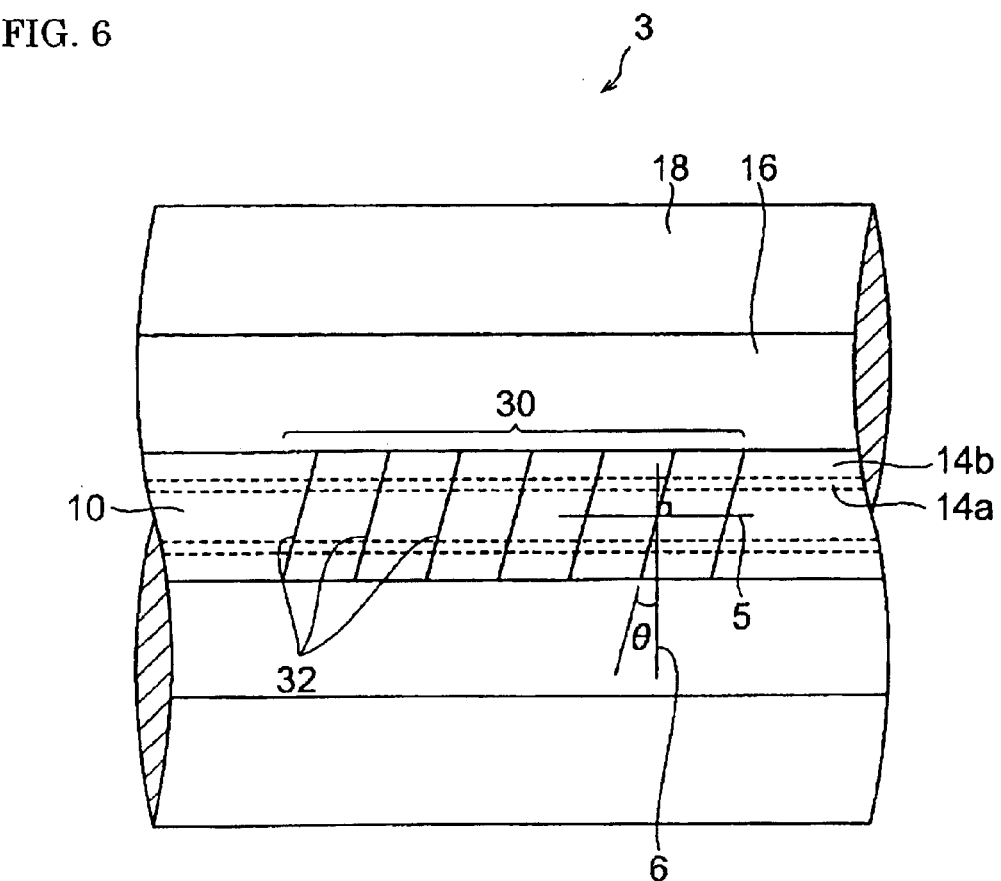
FIG. 6 is a side view of an optical fiber with a built-in grating in accordance with still another embodiment of the present invention.

The reflection at the Bragg wavelength is effectively reduced by forming, in the optical fiber, a grating having equal refractive index planes that are inclined with respect to the axis 5. FIG. 6 is a side view showing the construction of an optical fiber 3 having a built-in grating, in which a grating 30 is provided in place of the grating 20 shown in FIG. 4. The optical fiber 3 can also be fabricated easily by forming the grating 30 on the outer portion 14b of the inner cladding 14 of the optical fiber 1.

A tilt angle θ of the grating 30 is the angle formed by the plane orthogonal to the axis 5 and an equal refractive index surface 32. To sufficiently reduce the reflection, a tilt angle of 120 or more should be imparted to the grating 30.

The inventors have used a phase mask having a cycle of 1069 nm to form the grating 30 having the tilt angle θ of 2.5° over a length of 5 mm in the optical fiber 1. Then, the inventors have measured the loss spectrum and the reflection spectrum of the grating 30.

Figure 7:
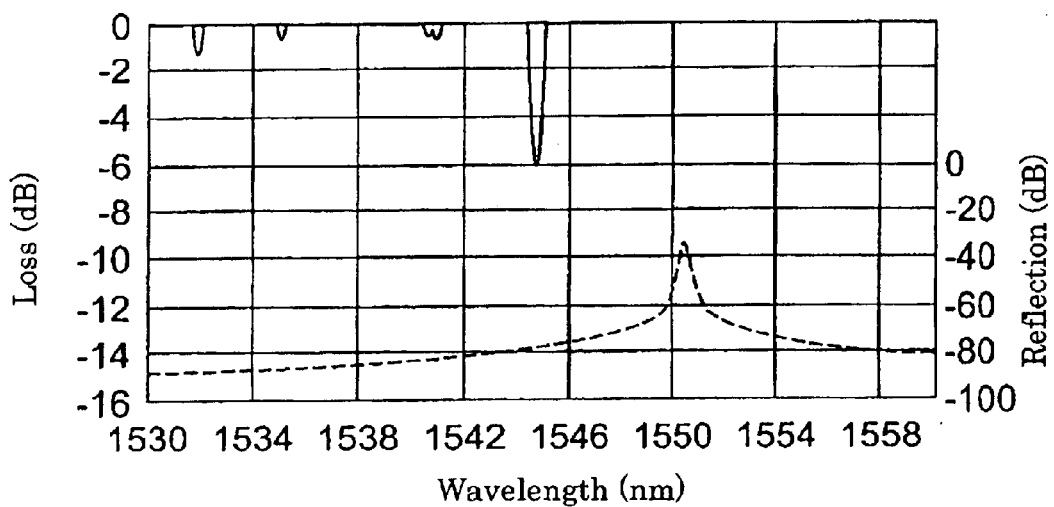
FIG. 7 is a graph showing a loss spectrum and a reflection spectrum of the optical fiber shown in FIG. 6.

FIG. 7 is a graph showing the measurement results, in which the loss spectrum is indicated by the solid line, while the reflection spectrum is indicated by the dashed line. As shown in FIG. 7, the grating has the narrow-band loss peak, whose half-value width is 0.5 nm, at a wavelength of 1544.8 nm. Moreover, the reflection at 1550.8 nm, which is a Bragg wavelength, is controlled to a low value of −32 dB. Thus, it has been verified that the Bragg reflection can be reduced by providing an optical fiber with a grating having equal refractive index planes that are inclined with respect to the axis of the optical fiber.

In the optical fibers 2 and 3 discussed above, the depth of the recession 19 provided in the refractive index profile of the clad 12 can be represented by a relative refractive index difference $(n_2-n_1)/n_1$ of the intermediate cladding 16. This value is −0.76% in the above embodiments. The refractive index $n_1$ of the inner cladding 14 is the refractive index of the inner cladding 14 excluding the grating 20, and is equivalent to the refractive index of pure silica glass in this embodiment.

Setting the relative refractive index difference of the intermediate cladding 16 to −0.3% or less makes it possible to restrain the efficiency of coupling between the outer cladding mode and the fundamental mode so as to sufficiently limit the loss band of the grating 20 or 30. Preferably, the relative refractive index difference between the inner cladding 14 and the intermediate cladding 16 is set to −1.0% or more so as to permit easy fabrication.

In order to satisfactorily restrain the reflection in the band of the loss peak, the outer portion 14b preferably has an inside diameter that is 1.2 times or more the outside diameter a of the core. If the outer portion 14b is larger than a mode field diameter, then the mode transformation efficiency deteriorates considerably. For this reason, it is desirable to set the inside diameter of the outer portion 14b to a value below twice the outside diameter a of the core.

In order to prevent the coupling of the fundamental mode with the outer cladding mode, it is preferable that the ratio of the outside diameters c/b (where b denotes the outside diameter of the inner cladding 14 and c denotes the outside diameter of the intermediate cladding 16) be set to 1.2 or more. Furthermore, in order to sufficiently restrain the bend loss caused by the cutoff of the fundamental mode, the ratio of outside diameters c/b between the inner cladding 14 and the intermediate cladding 16 is preferably set to below 4.

The refractive index $n_1$ of the inner cladding 14 and the refractive index $n_3$ of the outer cladding 18 may be the same.

The entire disclosure of Japanese Patent Application No. 2001-214256 filed on Jul. 13, 2001 including specification, claims drawings and summary are incorporated herein by reference in its entirely.

What is claimed is:

1. An optical fiber with a built-in rating, comprising:
    a core having a refractive index $n_0$;
    an inner cladding that surrounds the core and has a refractive index $n_1$;
    an intermediate cladding that surrounds the inner cladding and has a refractive index $n_2$; and
    an outer cladding that surrounds the intermediate cladding and has a refractive index $n_3$,
    wherein $n_0 > n_3 \geq n_1 > n_2$,
    grating is formed at least in a part of the inner cladding, and
    the relative refractive index difference between the inner cladding and the intermediate cladding, $(n_2-n_1)/n_1$, is more than −1.0% and less than or equal to 0.3%.

2. The optical fiber with a built-in grating according to claim 1, wherein the part in which grating is formed exists in an outer portion of the inner cladding, the outer portion being in contact with the intermediate cladding but not in contact with the core.

3. The optical fiber with a built-in grating according to claim 2, wherein the outer portion of the inner cladding is a portion having an inside diameter that is equal to 1.2 times or more and below double the outside diameter of the core.

4. The optical fiber with a built-in grating according to claim 1, wherein the inner cladding has an outside diameter b and the intermediate cladding has an outside diameter c, and an outside diameter ratio c/b of the inner cladding and the intermediate cladding is 1.2 or more and below 4.

5. The optical fiber with a built-in grating according to claim 1, wherein the grating has equal refractive index planes that are inclined with respect to an axis of the optical fiber.

6. An optical fiber for forming a grating therein, comprising:
    a core having a refractive index $n_0$;
    an inner cladding that surrounds the core and has a refractive index $n_1$;
    an intermediate cladding that surrounds the inner cladding and has a refractive index $n_2$; and
    an outer cladding that surrounds the intermediate cladding and has a refractive index $n_3$,
    wherein $n_0 > n_3 \geq n_1 > n_2$,
    at least a part of the inner cladding is photosensitive such that the refractive index thereof increases when irradiated by light, and
    the relative refractive index difference between the inner cladding and the intermediate cladding, $(_2-n_1)/n_1$ is more than −1.0% and less than or equal to 0.3%.

7. The optical fiber for forming a grating therein according to claim 6, wherein the part that is photo-sensitive exists in an outer portion of the inner cladding, the outer portion being in contact with the intermediate cladding but not in contact with the core.

8. The optical fiber for forming a grating according to claim 7, wherein the outer portion of the inner cladding is a portion having an inside diameter that is equal to 1.2 times or more and below double the outside diameter of the core.

9. The optical fiber for forming a grating therein according to claim 6, wherein the inner cladding has an outside diameter b and the intermediate cladding has an outside diameter c, and an outside diameter ratio c/b is 1.2 or more and below 4.

* * * * *

UNITED STATES PATENT AND TRADEMARK OFFICE
CERTIFICATE OF CORRECTION

PATENT NO. : 6,842,566 B2
DATED : January 11, 2005
INVENTOR(S) : Shinji Ishikawa et al.

It is certified that error appears in the above-identified patent and that said Letters Patent is hereby corrected as shown below:

<u>Column 6,</u>
Line 2, change "a built-in rating" to -- a built-in grating --;
Line 29, change "an outside diameter ration c/b of the inner cladding" to -- the ratio c/b of the inner cladding --;
Line 50, change "$(_2-n_1)/n_1$" to -- $(n_2-n_1)/n_1$ --.

Signed and Sealed this

Twenty-fourth Day of May, 2005

JON W. DUDAS
*Director of the United States Patent and Trademark Office*